United States Patent
Lin

(10) Patent No.: US 11,879,180 B2
(45) Date of Patent: Jan. 23, 2024

(54) EXPANDED ION-EXCHANGE MEMBRANE ELECTROLYSIS CELL

(71) Applicant: SHANGHAI ASCLEPIUS MEDITEC CO., LTD., Shanghai (CN)

(72) Inventor: Hsin-Yung Lin, Shanghai (CN)

(73) Assignee: Shanghai Asclepius Meditec Co., Ltd., Shanghai (CN)

( * ) Notice: Subject to any disclaimer, the term of this patent is extended or adjusted under 35 U.S.C. 154(b) by 164 days.

(21) Appl. No.: 16/854,455

(22) Filed: Apr. 21, 2020

(65) Prior Publication Data

US 2020/0340129 A1 Oct. 29, 2020

(30) Foreign Application Priority Data

Apr. 25, 2019 (CN) .......................... 201910336337.2

(51) Int. Cl.
*C25B 9/73* (2021.01)
*C25B 15/08* (2006.01)
(Continued)

(52) U.S. Cl.
CPC .................. *C25B 9/73* (2021.01); *C25B 1/04* (2013.01); *C25B 9/75* (2021.01); *C25B 9/77* (2021.01); *C25B 11/02* (2013.01); *C25B 15/08* (2013.01)

(58) Field of Classification Search
CPC .... C25B 1/04; C25B 9/73; C25B 9/75; C25B 11/02; C25B 13/02; C25B 11/036; C25B 15/08; C25B 9/21
See application file for complete search history.

(56) References Cited

U.S. PATENT DOCUMENTS

| 4,217,401 A | 8/1980 | Pellegri et al. |
| 6,017,648 A * | 1/2000 | Jones .................. H01M 8/0263 429/513 |

(Continued)

FOREIGN PATENT DOCUMENTS

| CN | 2059920 U | 8/1990 |
| CN | 101768752 A | 7/2010 |

(Continued)

OTHER PUBLICATIONS

Notice of Preliminary Rejection dated Oct. 8, 2021 for related Korean Patent Application No. 20-2020-0001401.

(Continued)

*Primary Examiner* — Brian W Cohen
(74) *Attorney, Agent, or Firm* — Rosenberg, Klein & Lee

(57) ABSTRACT

An expanded ion-exchange membrane electrolysis cell comprises an anode plate, a cathode plate, at least one bipolar electrode plate, a first ion-exchange membrane plate, a second ion-exchange membrane plate, a plurality of hydrogen chambers and a plurality of oxygen chambers. Wherein, a hydrogen outlet channel, an oxygen outlet channel and a water inlet channel are formed in the expanded ion-exchange membrane electrolysis cell. The hydrogen outlet channel is coupled to each of the plurality of hydrogen chambers, and the oxygen outlet channel and the water inlet channel are coupled to each of the plurality of oxygen chambers to provide the expanded ion-exchange membrane electrolysis cell capable of diverting gas and liquid after electrolyzing water.

20 Claims, 12 Drawing Sheets

(51) Int. Cl.
  *C25B 1/04* (2021.01)
  *C25B 9/77* (2021.01)
  *C25B 9/75* (2021.01)
  *C25B 11/02* (2021.01)

(56) References Cited

U.S. PATENT DOCUMENTS

| | | | | |
|---|---|---|---|---|
| 6,410,179 B1* | 6/2002 | Boyer | ................ | H01M 8/2483 |
| | | | | 429/514 |
| 2006/0099479 A1* | 5/2006 | Friedman | ............ | H01M 8/0273 |
| | | | | 429/510 |
| 2011/0177429 A1* | 7/2011 | Shiu | ................... | H01M 8/2483 |
| | | | | 429/514 |
| 2011/0198217 A1* | 8/2011 | Nakazawa | ................ | C25B 9/77 |
| | | | | 204/252 |
| 2015/0200401 A1* | 7/2015 | Vandenborre | ....... | H01M 4/8875 |
| | | | | 204/268 |
| 2018/0320275 A1* | 11/2018 | Lin | ........................ | C25B 9/73 |
| 2021/0310136 A1* | 10/2021 | Janáky | ..................... | C25B 9/75 |

FOREIGN PATENT DOCUMENTS

| | | | |
|---|---|---|---|
| CN | 201990733 U | 9/2011 | |
| CN | 103806014 A | 5/2014 | |
| CN | 204138781 U | 2/2015 | |
| CN | 104584302 A | 4/2015 | |
| CN | 104928705 A | 9/2015 | |
| CN | 106367776 A | 2/2017 | |
| CN | 107198402 A | 9/2017 | |
| CN | 207659530 U | 7/2018 | |
| CN | 108624903 A | 10/2018 | |
| EP | 0007078 A2 | 1/1980 | |
| JP | S55-012692 A | 1/1980 | |
| JP | H0569916 B2 | 10/1993 | |
| JP | 2002-332586 A | 11/2002 | |
| JP | 2010-189689 A | 9/2010 | |
| JP | 2011150997 A | 8/2011 | |
| KR | 10-2002-0085446 A | 11/2002 | |
| KR | 20110124415 * | 11/2011 | ............... C25B 9/23 |
| KR | 101944730 B1 | 2/2019 | |
| TW | 201723233 * | 7/2017 | ............... C25B 1/10 |
| WO | 2016076857 A1 | 5/2016 | |
| WO | WO2020039218 A1 | 2/2020 | |

OTHER PUBLICATIONS

Notification of Reason for Refusal dated Oct. 5, 2021 for related Japanese Patent Application No. 2020-074285.
Notice of Decision of Rejection dated May 24, 2022 for related Korean Patent Application No. 20-2020-0001401.
Notification of Reason for Refusal dated May 24, 2022 for related Japanese patent application No. 2020 074285.
First Office Action Mailed to Korean Counterpart Patent Application No. 20-2023-0000032 dated Jun. 5, 2023 with English Translation.
First Office Action Mailed to Korean Counterpart Patent Application No. 20-2023-0000033 dated Jun. 5, 2023 with English Translation.

* cited by examiner

EXPANDED ION-EXCHANGE MEMBRANE ELECTROLYSIS CELL

The present application is based on, and claims priority from, China application number CN201910336337.2, filed on 2019 Apr. 25, the disclosure of which is hereby incorporated by reference herein in its entirety.

BACKGROUND OF THE INVENTION

Field of the Invention

The present invention provides an ion-exchange membrane electrolysis cell, more particularly, to an expanded ion-exchange membrane electrolysis cell capable of electrolyzing water and diverting gas and liquid.

Description of the Prior Art

Ion-exchange membrane electrolysis cells are one of the cells commonly used to electrolyze water. Traditional ion-exchange membrane electrolysis cells are equipped with an ion-exchange membrane that separates an anode section and a cathode section, and have a water inlet/outlet and/or a gas inlet/outlet. However, the space of the traditional ion-exchange membrane electrolysis cells is only divided into two sections, and only one electrode plate can be disposed in each section. In the case that a large amount of water needs to be electrolyzed, the traditional ion-exchange membrane electrolysis cell just can increase the volume of the electrolysis cell and increase the area of the electrode plate to increase the amount of water for electrolyzing. However, the amount of water for electrolysis is not directly proportional to the increase in the volume of the electrolysis cell and the area of the electrode plate, so that the electrolytic efficiency of the traditional ion-exchange membrane electrolysis cell cannot be significantly improved.

As can be seen from the problems described above, providing an ion-exchange membrane electrolysis cell to solve the above problems is an object that must be improved.

SUMMARY OF THE INVENTION

In response to the above-mentioned problems, an objective of the present invention is to provide an expanded ion-exchange membrane electrolysis cell. According to a specific embodiment of the present invention, the expanded ion-exchange membrane electrolysis cell comprises an anode plate, a cathode plate, at least one bipolar electrode plate, a first ion-exchange membrane plate, a second ion-exchange membrane plate, a plurality of oxygen chambers and a plurality of hydrogen chambers. The at least one bipolar electrode plate is disposed between the anode plate and the cathode plate. The first ion-exchange membrane plate is disposed between the anode plate and the at least one bipolar electrode plate, and the second ion-exchange membrane plate is disposed between the at least one bipolar electrode plate and the cathode plate. The plurality of oxygen chambers are formed between the anode plate and the first ion-exchange membrane plate and between the at least one bipolar electrode plate and the second ion-exchange membrane plate, and the plurality of hydrogen chambers are formed between the first ion-exchange membrane plate and the at least one bipolar electrode plate and between the second ion-exchange membrane plate and the cathode plate. A hydrogen outlet channel, an oxygen outlet channel and a water inlet channel are formed in the expanded ion-exchange membrane electrolysis cell, the hydrogen outlet channel is coupled to each of the plurality of the hydrogen chambers, and the oxygen outlet channel and the water inlet channel are coupled to each of the plurality of oxygen chambers.

In an embodiment, the oxygen chambers comprise a first oxygen chamber adjacent to the anode plate. One surface of the anode plate has a convex periphery and a recessed center. A space is formed in the recessed center, and the first oxygen chamber comprises the space. The convex periphery has a plurality of holes corresponding to a portion of the hydrogen outlet channel, a portion of the oxygen outlet channel and a portion of the water inlet channel when the anode plate and the first ion-exchange membrane plate are stacked, and the oxygen outlet channel and the water inlet channel are coupled to the recessed center.

In an embodiment, the hydrogen chambers comprise a first hydrogen chamber adjacent to the cathode plate. One surface of the cathode plate has a convex periphery and a recessed center. A space is formed in the recessed center, and the first hydrogen chamber comprises the space, and the hydrogen outlet channel is coupled to the recessed center.

In an embodiment, the at least one bipolar electrode plate has a cathode surface and an anode surface, each of the cathode surface and the anode surface has a convex periphery and a recessed center. The hydrogen chambers comprise a second hydrogen chamber adjacent to the cathode surface of the at least one bipolar electrode plate. A first space is formed in the recessed center, and the second hydrogen chamber comprises the first space. The oxygen chambers include a second oxygen chamber adjacent to the anode surface of the at least one bipolar electrode plate. A second space is formed in the recessed center, and the second oxygen chamber comprises the second space. The convex peripheries of the cathode surface and the anode surface have a plurality of holes corresponding to a portion of the hydrogen outlet channel, a portion of the oxygen outlet channel and a portion of the water inlet channel when being stacked, the hydrogen outlet channel is coupled to the recessed center of the cathode surface, and the oxygen outlet channel and the water inlet channel are coupled to the recessed center of the anode surface.

In an embodiment, the expanded ion-exchange membrane electrolysis cell further comprises a plurality of silicon sealing gaskets. The silicon sealing gaskets are respectively disposed between the anode plate and the first ion-exchange membrane plate, between the first ion-exchange membrane plate and the at least one bipolar electrode plate, between the at least one bipolar electrode plate and the second ion-exchange membrane plate, and between the second ion-exchange membrane plate and the cathode plate. Each of the silicon sealing gaskets is a hollow annular structure formed by a hollow section and an annular section. The hydrogen outlet channel, the oxygen outlet channel, and the water inlet channel pass through the annular section of each of the silicon sealing gaskets.

In an embodiment, the expanded ion-exchange membrane electrolysis cell further comprises a plurality of diffuser plates respectively disposed in the hollow section of each of the silicon sealing gaskets, and respectively attached to the adjacent first ion-exchange membrane plate or the adjacent second ion-exchange membrane plate.

In an embodiment, at least one of a surface of the anode plate, a surface of the cathode plate and two surfaces of the at least one bipolar electrode plate has a recessed center. The recessed center has a plurality of bumps and a plurality of grooves formed between the bumps. The bumps are configured to abut the corresponding diffuser plate. When the anode plate, the cathode plate, the at least one bipolar electrode plate, the first ion-exchange membrane plate and the second ion-exchange membrane plate are stacked, the bumps make the corresponding diffuser plate abuts the corresponding first ion-exchange membrane plate or the corresponding second ion-exchange membrane plate. The grooves are respectively coupled to at least one of the hydrogen outlet channel, the oxygen outlet channel and the water inlet channel.

In an embodiment, the diffuser plates have a plurality of pores, so that water, hydrogen, and oxygen flow through the pores.

In an embodiment, the expanded ion-exchange membrane electrolysis cell further comprises a plurality of separators. The separators are respectively disposed at the junctions of each of the hydrogen chambers to the hydrogen outlet channel and the junctions of the oxygen chambers to the oxygen outlet channel and to the water inlet channel. The separators respectively abut against the corresponding silicon sealing gaskets to form a plurality of ports, and the hydrogen outlet channel is coupled to the hydrogen chambers through a portion of the ports, and the oxygen outlet channel and the water inlet channel are coupled to the oxygen chambers through another portion of the ports.

In an embodiment, the expanded ion-exchange membrane electrolysis cell further comprises at least one electrical insulation thermal board disposed above at least one position of a side of the anode plate opposite to the other side facing the cathode plate and a side of the cathode plate opposite to the other side facing the anode plate. The at least one electrical insulation thermal board is configured to isolate the current of the expanded ion-exchange membrane electrolysis cell from the external environment, and conduct the thermal energy in the expanded ion-exchange membrane electrolysis cell to the external environment.

In an embodiment, the expanded ion-exchange membrane electrolysis cell further comprises at least one radiating plate disposed above at least one position of a side of the anode plate opposite to the other side facing the cathode plate and a side of the cathode plate opposite to the other side facing the anode plate. The at least one radiating plate is configured to dissipate the thermal energy in the expanded ion-exchange membrane electrolysis cell to the external environment.

In an embodiment, the expanded ion-exchange membrane electrolysis cell further comprises a plurality of lock channels and a plurality of lock components. The lock channels pass through the anode plate, the cathode plate, the at least one bipolar electrode plate, the first ion-exchange membrane plate and the second ion-exchange membrane plate for fitting the lock components.

In other specific embodiment, the expanded ion-exchange membrane electrolysis cell of the present invention comprises an anode plate, a cathode plate, a first bipolar electrode plate, a first ion-exchange membrane plate, a second ion-exchange membrane plate, a first oxygen chamber, a second oxygen chamber, a first hydrogen chamber and a second hydrogen chamber. The first bipolar electrode plate is disposed between the anode plate and the cathode plate. The first ion-exchange membrane plate is able to be accommodated between the anode plate and the first bipolar electrode plate. The second ion-exchange membrane plate is able to be accommodated between the cathode plate and the first bipolar electrode plate. The first oxygen chamber is adjacent to the anode plate, the first hydrogen chamber is adjacent to the cathode plate, the second oxygen chamber is adjacent to an anode surface of the first bipolar electrode plate, and the second hydrogen chamber is adjacent to a cathode surface of the first bipolar electrode plate. Wherein an oxygen outlet channel is coupled to the first oxygen chamber and the second oxygen chamber, and a hydrogen outlet channel is coupled to the first hydrogen chamber and the second hydrogen chamber.

In an embodiment, the first oxygen chamber is not fluidly coupled to the first hydrogen chamber and the second hydrogen chamber, and the second oxygen chamber is not fluidly coupled to the first hydrogen chamber and the second hydrogen chamber.

In an embodiment, the oxygen outlet channel extends at least from the anode plate to the cathode plate, and the hydrogen outlet channel extends at least from the anode plate to the cathode plate.

In an embodiment, the anode plate and the cathode plate respectively comprise a first recessed center, a plurality of first bumps and a plurality of first grooves. The first bumps are disposed in the first recessed center, and the first grooves are disposed between the first bumps. The first oxygen chamber comprises the first grooves of the anode plate, and the first grooves of the anode plate are coupled to the oxygen outlet channel; the first hydrogen chamber comprises the first grooves of the cathode plate, and the first grooves of the cathode plate are coupled to the hydrogen outlet channel.

In an embodiment, the anode surface and the cathode surface of the first bipolar electron plate respectively comprise a second recessed center, a plurality of second bumps and a plurality of second grooves. The second bumps are disposed in the second recessed center, and the second grooves are disposed between the second bumps. The second oxygen chamber comprises the second grooves of the anode surface, and the second grooves of the anode surface coupled to the oxygen outlet channel. The second hydrogen chamber comprises the second grooves of the cathode surface, and the second grooves of the cathode surface are coupled to the hydrogen outlet channel.

In an embodiment, the expanded ion-exchange membrane electrolysis cell further comprises an oxygen conduit and a hydrogen conduit. The oxygen outlet channel passes through the cathode plate or the anode plate and is coupled to the oxygen conduit, and the hydrogen outlet channel passes through the cathode plate or the anode plate and is coupled to the hydrogen conduit.

In an embodiment, the expanded ion-exchange membrane electrolysis cell further comprises a second bipolar electrode plate, a third oxygen chamber and a third hydrogen chamber. The second bipolar electrode plate is disposed between the anode plate and the cathode plate. The third oxygen chamber is adjacent to an anode surface of the second bipolar electrode plate. The third hydrogen chamber is adjacent to a cathode surface of the second bipolar electrode plate. The oxygen outlet channel is coupled to the first oxygen chamber, the second oxygen chamber and the third oxygen chamber, and the hydrogen outlet channel is coupled to the first hydrogen chamber, the second hydrogen chamber and the third hydrogen chamber.

In an embodiment, the third oxygen chamber is not fluidly coupled to the first hydrogen chamber, the second hydrogen chamber and the third hydrogen chamber, and the third hydrogen chamber is not fluidly coupled to the first oxygen chamber, the second oxygen chamber and the third oxygen chamber.

Compared with the prior art, the expanded ion-exchange membrane electrolysis cell of the present invention has the following advantages:

1. The anode plate, the cathode plate, the bipolar electrode plate, the first ion-exchange membrane plate and the second ion-exchange membrane plate of the expanded ion-exchange membrane electrolysis cell of the present invention are independent plates. When the problem of calcium accumulation occurs after electrolysis, the expanded ion-exchange membrane electrolysis cell can be disassembled for cleaning. Even when any part of the expanded ion-exchange membrane electrolysis cell is severely damaged, the damaged plate can be directly replaced with a new one intended of replacing multiple components or the entire electrolysis.
2. The anode plate, the cathode plate and the bipolar electrode plate of the expanded ion-exchange membrane electrolysis cell of the present invention can all be integrally formed electrode plates without the problem of unstable installation that prevents the electrolytic cell from operating.
3. The expanded ion-exchange membrane electrolysis cell of the present invention is mainly formed by laminating one anode plate, one cathode plate and at least one bipolar electrode plate. The anode plate and the cathode plate are connected to positive and negative currents respectively for electrolysis, and the bipolar electrode plate does not need to be connected to the current. The bipolar electrode plate uses a potential difference between the anode plate and the cathode plate to form the positive and the negative polarity. The expanded ion-exchange membrane electrolysis cell of the present invention uses the bipolar electrode plate to eliminate the configuration that requires each electrode plate to communicate with the current, and also to eliminate the problem of the traditional electrolysis cell be caused by the multiple electrode plates connecting with the positive contacts and negative contacts.
4. The bipolar electrode plate of the expanded ion-exchange membrane electrolysis cell of the present invention is a cathode for an electrolytic space formed between the anode plate and the bipolar electrode plate, and the bipolar electrode plate is an anode for an electrolytic space formed between the cathode plate and the bipolar electrode plate. Since this characteristic, one surface of the bipolar electrode plate can electrolyze water to generate hydrogen, and another surface can electrolyze water to generate oxygen. Therefore, compared with the traditional electrolysis cell which requires the anode plate and the cathode plate to be staggered, the number of electrode plates disposed in the expanded ion-exchange membrane electrolysis cell of the present invention is less than that of the traditional electrolysis cell, thereby saving cost and volume.
5. The expanded ion-exchange membrane electrolysis cell of the present invention uses the structural design of the anode plate, the cathode plate and the bipolar electrode plate themselves to guide the flow of water and gas, instead of the traditional electrolysis cell that uses a linear sealing gasket to guide the flow. Therefore, the expanded ion-exchange membrane electrolysis cell eliminates the problem that the traditional electrolysis cell is misaligned due to aging of the sealing gasket or due to the linear sealing gasket.

BRIEF DESCRIPTION OF THE APPENDED DRAWINGS

Some of the embodiments will be described in detail, with reference to the following figures, wherein like designations denote like members, wherein.

The advantages, spirits, and features of the present invention will be explained and discussed with embodiments and figures as follows.

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications can be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

In the description of the present specification, the terminologies "in an embodiment", "in another embodiment", or "in some embodiments" means that the specific feature, structure, material or characteristic of the present embodiment is involved in at least one embodiment of the present invention. In the description of the present specification, the schematic representation of the mentioned terminologies does not necessarily refer to the same embodiment. Furthermore, the described specific feature, structure, material or characteristic can be involved in any one or more embodiments in a proper way.

In the embodiments of the present specification, the terminology "or" includes the combination of part of listed components, and the combination of all the listed components. For example, the described "A or B" includes only A, only B, and both A and B. Moreover, the terminologies "a" and "the" before the element or component of the present invention do not limit the number of element or component. Therefore, the terminologies "a" and "the" should be read as including one or at least one. Besides, the singular form of element or component also includes the plural form, unless the number clearly refers to the singular form.

Figure 1:
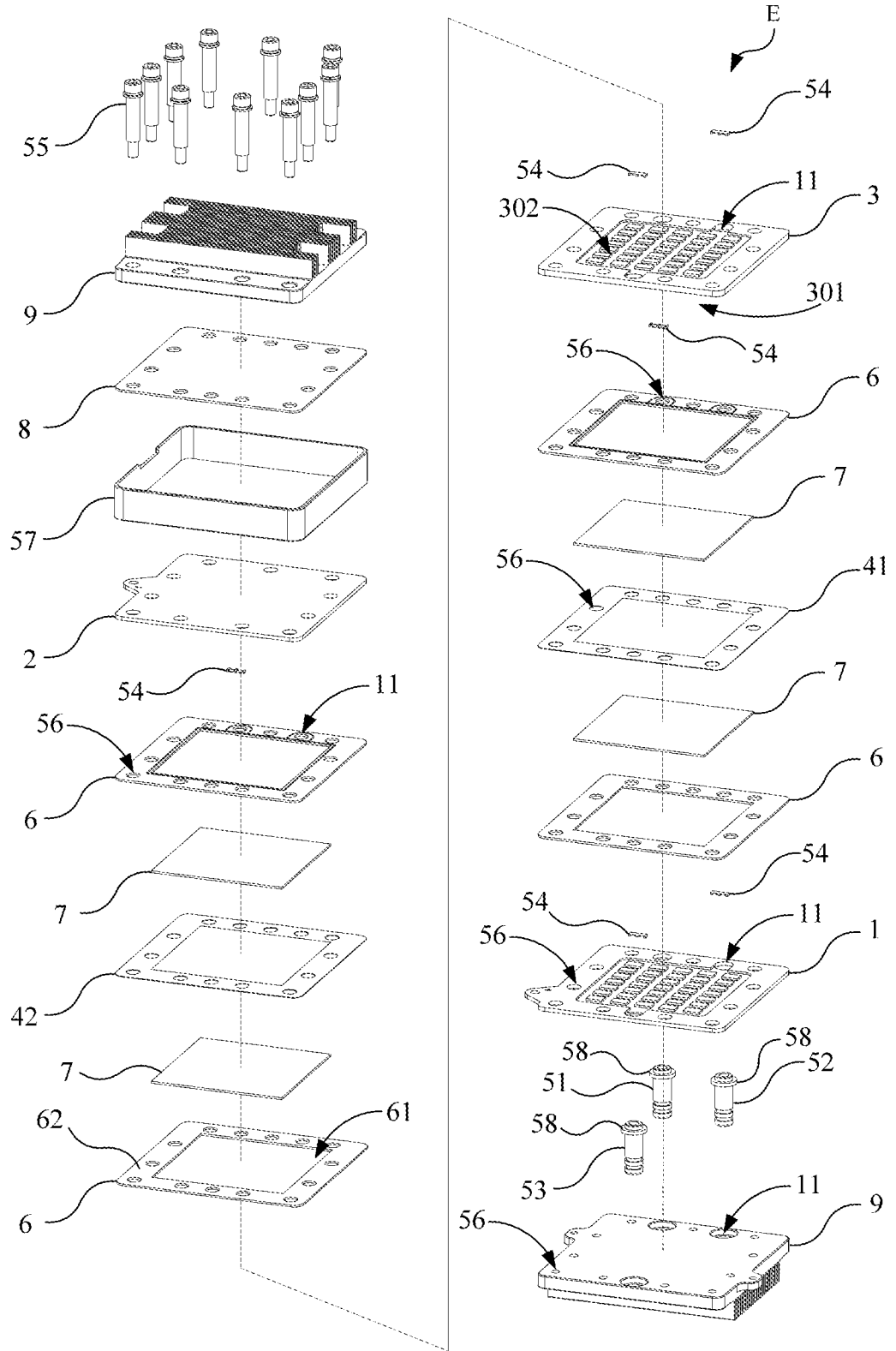
FIG. 1 shows a structural exploded schematic diagram of one embodiment of an expanded ion-exchange membrane electrolysis cell of the present invention.
Figure 2:
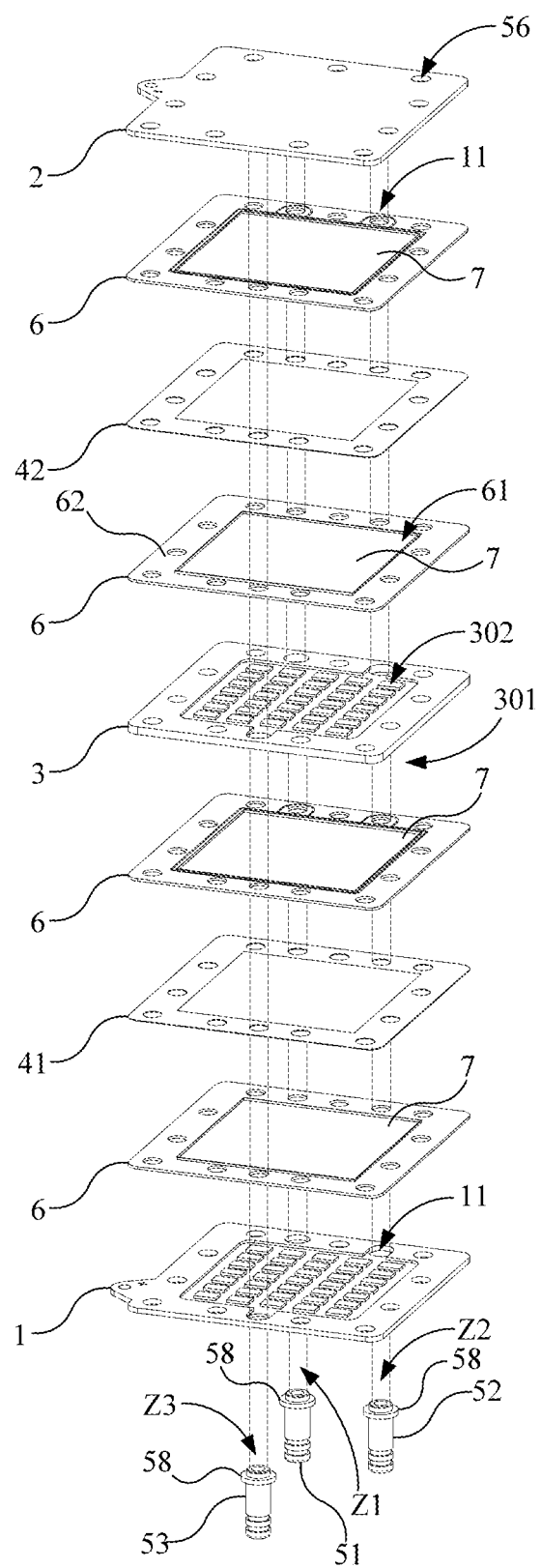
FIG. 2 shows a schematic diagram of a hydrogen outlet channel, an oxygen outlet channel and a water inlet channel according to FIG. 1.

Please refer to FIG. 1 and FIG. 2. FIG. 1 shows a structural exploded schematic diagram of one embodiment of an expanded ion-exchange membrane electrolysis cell E of the present invention. FIG. 2 shows a schematic diagram of a hydrogen outlet channel Z1, an oxygen outlet channel Z2 and a water inlet channel Z3 according to FIG. 1. As shown in FIG. 1, an expanded ion-exchange membrane electrolysis cell E of the present invention comprises an anode plate 1, a cathode plate 2, at least one bipolar electrode plate 3, a first ion-exchange membrane plate 41, and a second ion-exchange membrane plate 42. The bipolar electrode plate 3 is disposed between the anode plate 1 and the cathode plate 2. The first ion-exchange membrane plate 41 is disposed between the anode plate 1 and the bipolar electrode plate 3, and the second ion-exchange membrane plate 42 is disposed between the cathode plate 2 and the bipolar electrode plate 3. In this embodiment, as shown in FIG. 2, when the anode plate 1, the cathode plate 2, the bipolar electrode plate 3, the first ion-exchange membrane plate 41, and the second ion-exchange membrane plate 42 are stacked on each other, a hydrogen outlet channel Z1, an oxygen outlet channel Z2 and a water inlet channel Z3, which are communicated with the anode plate 1, the cathode plate 2, the bipolar electrode plate 3, the first ion-exchange membrane plate 41 and the second ion-exchange membrane plate 42, are formed in the expanded ion-exchange membrane electrolysis cell E. In one embodiment, the oxygen outlet channel Z2 is extended at least from the anode plate 1 to the cathode plate 2, and the hydrogen outlet channel Z1 is extended at least from the anode plate 1 to the cathode plate 2.

In detail, FIG. 2 shows the expanded ion-exchange membrane electrolysis cell E with a single-side entry and exit structure for the anode, which inputs the water and respectively outputs the hydrogen and the oxygen. In the single-side entry and exit structure for the anode of this embodiment, the anode plate 1, the bipolar electrode plate 3, the first ion-exchange membrane plate 41 and the second ion-exchange membrane plate 42 all have holes 11 corresponding to each other. When the electrode plates are assembled and connected, the corresponding holes 11 are communicated with each other to form the hydrogen outlet channel Z1, the oxygen outlet channel Z2 and the water inlet channel Z3. At this time, there are no corresponding holes 11 in the cathode plate 2; thereby, the channels do not pass through the cathode plate 12, and the water, the hydrogen and the oxygen input and output from one side. Conversely, if the expanded ion-exchange membrane electrolysis cell E is a single-side entry and exit structure for the cathode, the cathode plate 2, the bipolar electrode plate 3, the first ion-exchange membrane plate 41 and the second ion-exchange membrane plate 42 all have holes 11 corresponding to each other. The holes 11 communicate with each other to form the hydrogen outlet channel Z1, the oxygen outlet channel Z2 and the water inlet channel Z3, and there are no corresponding holes 11 in the anode plate 1. If the expanded ion-exchange membrane electrolysis cell E is a double-side entry and exit structure, the hydrogen outlet channel Z1, the oxygen outlet channel Z2 and the water inlet channel Z3 can be single-open or double-opens. If it is single-open, one side outputs the hydrogen and the other side outputs the oxygen and the water. According to the design principle mentioned above, there are corresponding holes 11 in the side for entry and exit, and there are no corresponding holes 11 in another side corresponding the side for entry and exit. If it is double-opens, the hydrogen, the oxygen and the water can enter and exit in both sides, and there are corresponding holes 11 on the two sides. With this open design, the hydrogen, the oxygen and the water are respectively in the flow direction of the hydrogen outlet channel Z1, the oxygen outlet channel Z2 and the water inlet channel Z3. In practice, the expanded ion-exchange membrane electrolysis cell E further comprises an oxygen conduit 52 and a hydrogen conduit 51. The oxygen outlet channel Z2 penetrates the anode plate 1 or the cathode plate 2 to connect the oxygen conduit 52, and the hydrogen outlet channel Z1 penetrates the cathode plate 2 or the anode plate 1 to connect the hydrogen conduit 51. In other words, the expanded ion-exchange membrane electrolysis cell E of the present invention further comprises the hydrogen conduit 51, which extends to communicate with the hydrogen outlet channel Z1, the oxygen conduit 52, which extends to communicate with the oxygen outlet channel Z2, and a water conduit 53, which extends to communicate with the water inlet channel Z3, to input the water to the expanded ion-exchange membrane electrolysis cell E, and collect the hydrogen and the oxygen from the expanded ion-exchange membrane electrolysis cell E.

Figure 3A:
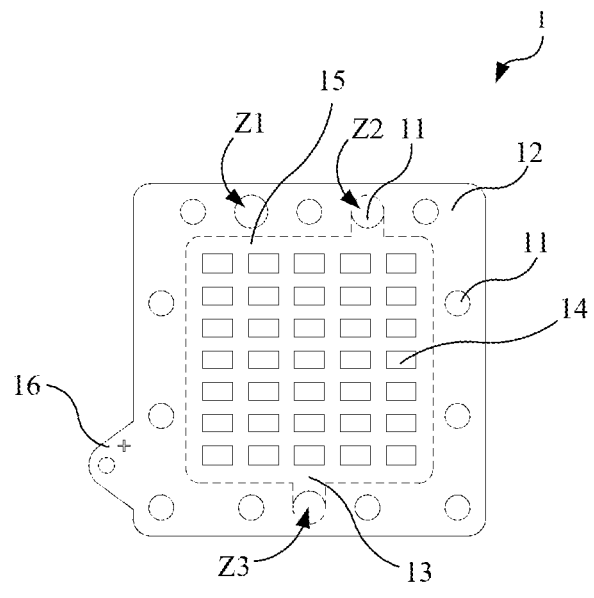
FIG. 3a, FIG. 3b and FIG. 3c show a schematic diagram of different views of an anode plate according to FIG. 1.
Figure 3B:
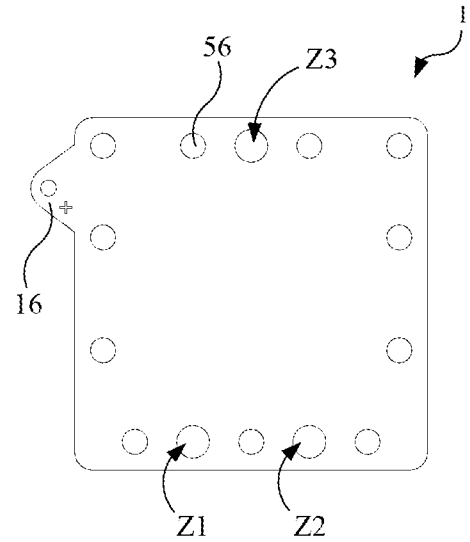
Figure 3C:
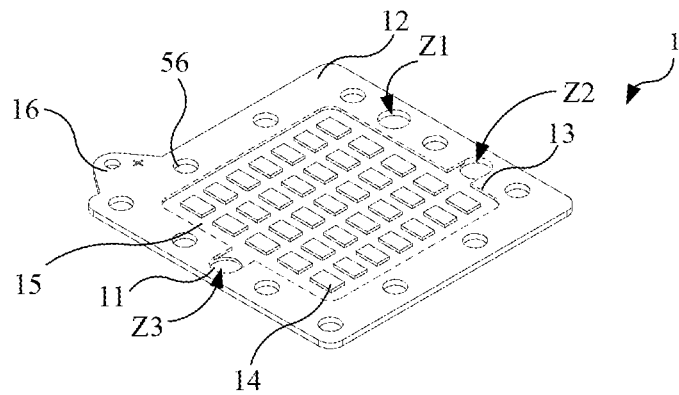
Figure 4A:
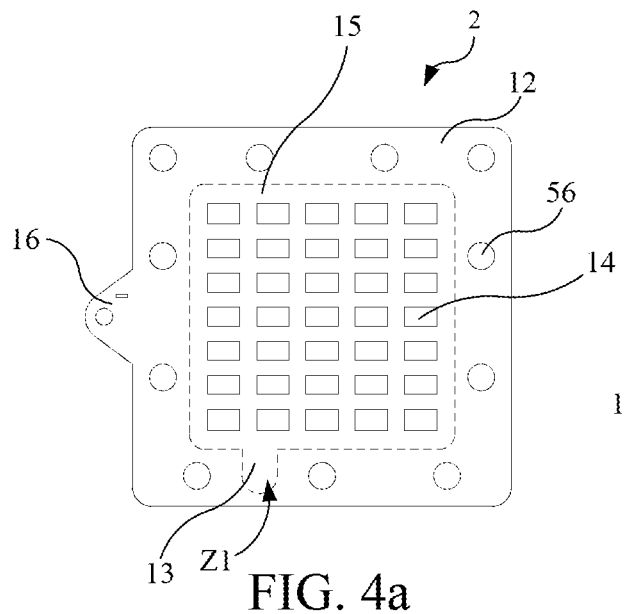
FIG. 4a, FIG. 4b and FIG. 4c show a schematic diagram of different views of a cathode plate according to FIG. 1.
Figure 4B:
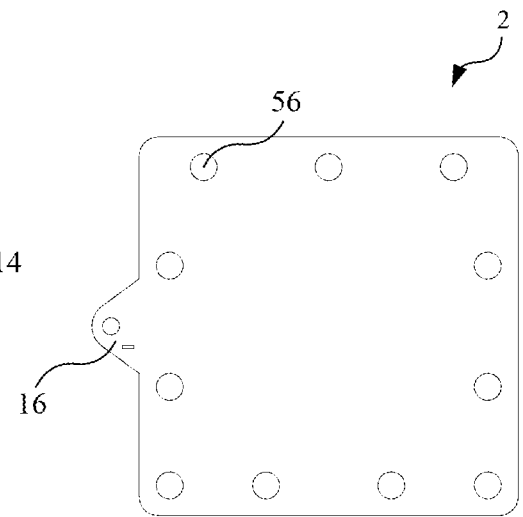
Figure 4C:
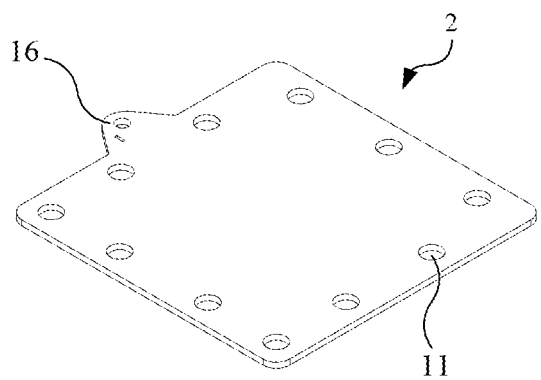
Figure 5A:
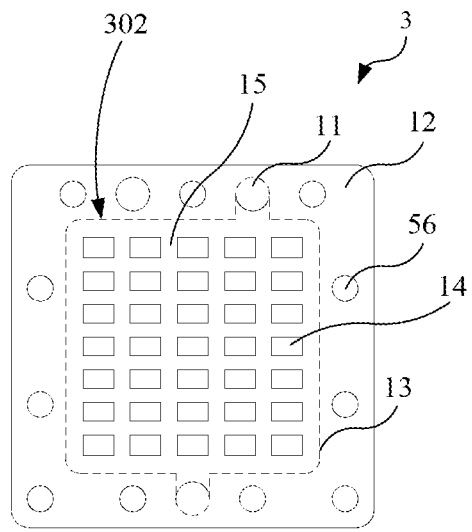
FIG. 5a, FIG. 5b and FIG. 5c show a schematic diagram of different views of a dipolar electrode plate according to FIG. 1.
Figure 5B:
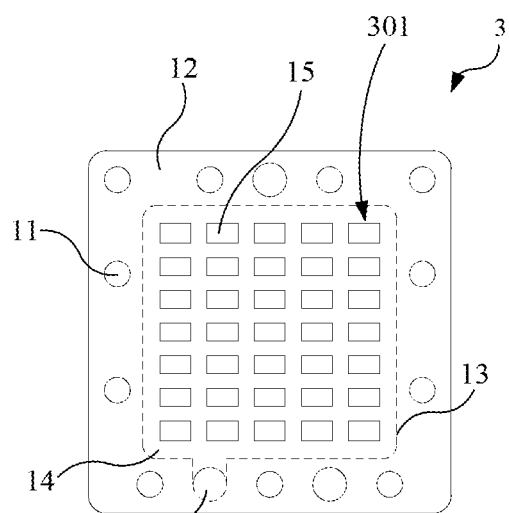
Figure 5C:
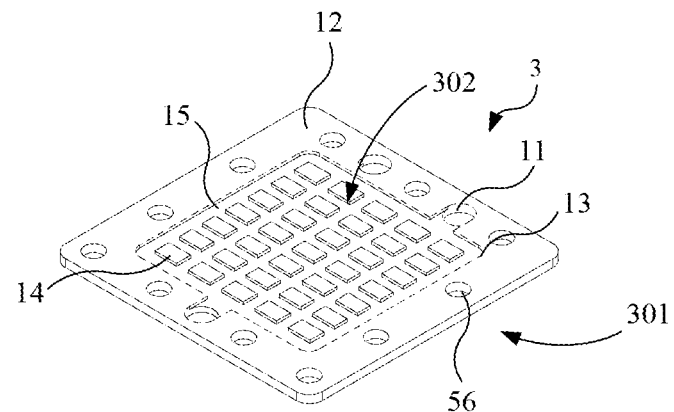
Figure 6:
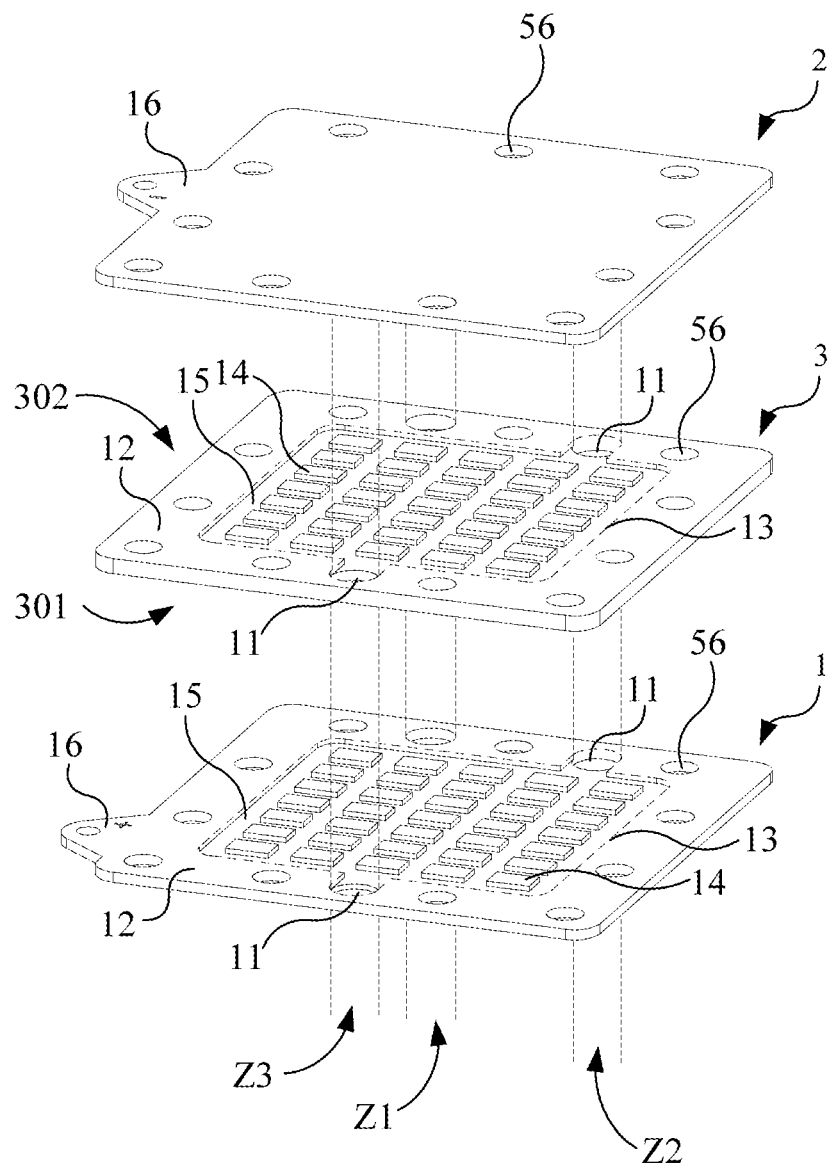
FIG. 6 shows a stacking schematic diagram of the anode plate, the cathode plate and the bipolar electrode plate according to FIG. 1.
Figure 7:
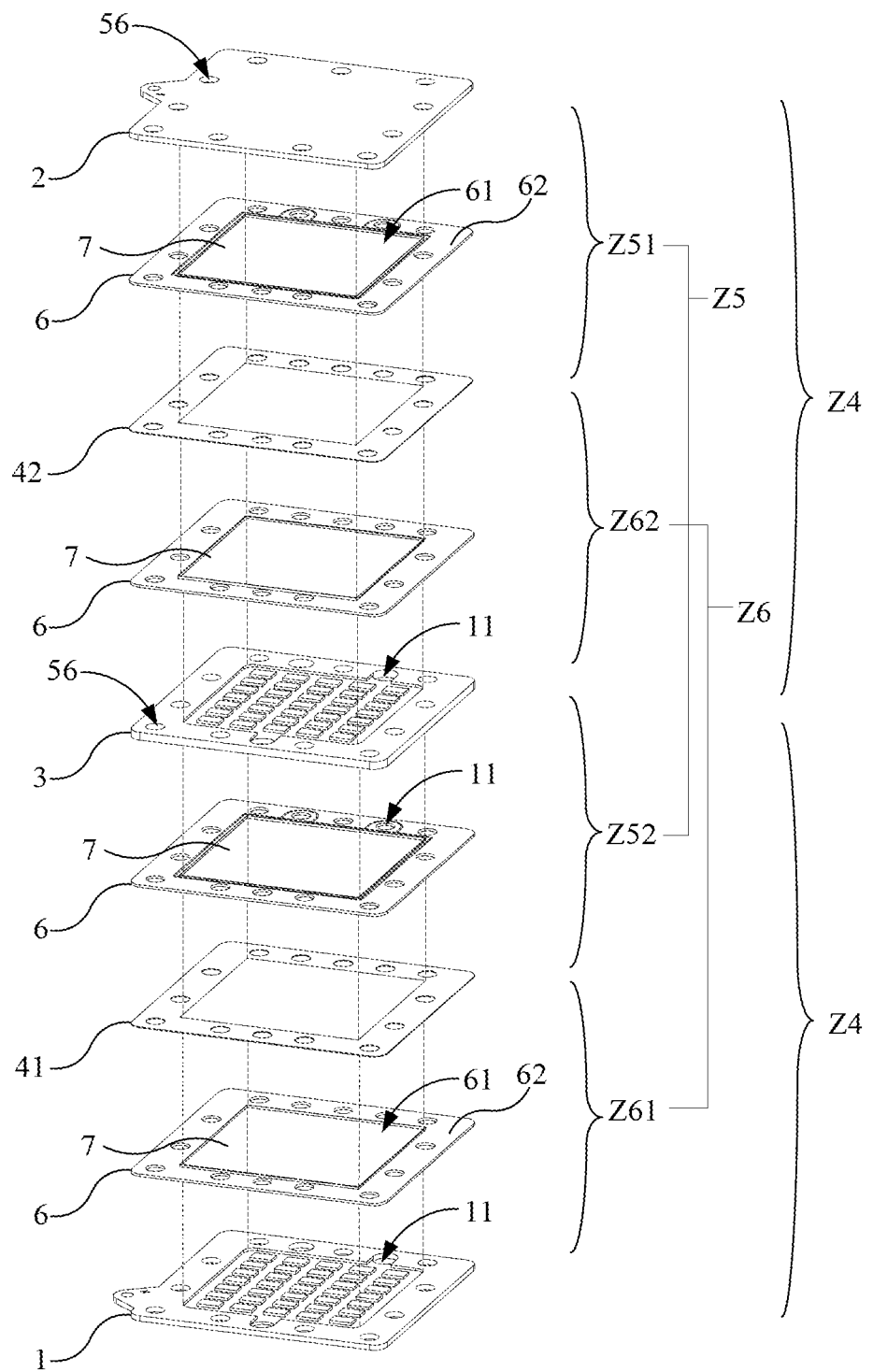
FIG. 7 shows a schematic diagram of an electrolytic space according to FIG. 1.

Please refer to FIG. 3a to FIG. 7. FIG. 3a, FIG. 3b and FIG. 3c show a schematic diagram of different views of the anode plate 1 according to FIG. 1. FIG. 4a, FIG. 4b and FIG. 4c show a schematic diagram of different views of the cathode plate 2 according to FIG. 1. FIG. 5a, FIG. 5b and FIG. 5c show a schematic diagram of different views of the dipolar electrode plate 3 according to FIG. 1. FIG. 6 shows a stacking schematic diagram of the anode plate 1, the cathode plate 2 and the bipolar electrode plate 3 according to FIG. 1. FIG. 7 shows a schematic diagram of an electrolytic space Z4 according to FIG. 1.

In a specific embodiment, the anode plate 1 and the cathode plate 2 all comprise a recessed center 13, a plurality of bumps 14 and a plurality of grooves 15. The bumps 14 are disposed in the recessed center 13, and the grooves 15 are disposed between the bumps 14. A first oxygen chamber Z61 comprises the grooves 15 of the anode plate 1 and the grooves 15 of the anode plate 1 communicate the oxygen outlet channel Z2. A first hydrogen chamber Z51 comprises the grooves of the cathode plate 2, and the grooves 15 of the cathode plate 2 communicate with the hydrogen outlet channel Z1. An anode surface 302 and a cathode surface 301 of bipolar electrode plate 3 all comprise the recessed center 13, the plurality of bumps 14 and the plurality of grooves 15. The bumps 14 are disposed in the recessed center 13, and the grooves 15 are disposed between the bumps 14. A second oxygen chamber Z62 comprises the grooves 15 of the anode surface 302, and the grooves 15 of the anode surface 302 communicate the oxygen outlet channel Z2. A second hydrogen chamber Z52 comprises the grooves 15 of the cathode surface 301, and the grooves 15 of the cathode surface 301 communicate with the hydrogen outlet channel Z1.

In other words, as shown in FIG. 3, FIG. 4 and FIG. 5, FIG. 3a, FIG. 4a and FIG. 5a are front views; FIG. 3b, FIG. 4b and FIG. 5b are back views; FIG. 3c, FIG. 4c and FIG. 5c are schematic diagrams of appearance. One surface of the anode plate 1 and one surface of the cathode plate 2, and two surfaces of the bipolar electrode plate 3 have special structures. The special structure has a convex periphery 12 in a ring shape, and the recessed center 13 in middle. For the sake of clarity, the recessed center 13 is a selected area framed by a dotted line. The bumps 14 and the grooves 15 formed between the bumps 14 are disposed in the recessed center 13. The difference is that the special structures on the anode plate 1, the cathode plate 2 and the bipolar electrode plate 3 are slightly different in design.

As shown in FIG. 2, FIG. 3 and FIG. 7, one surface of the anode plate 1 has the special structure (as shown in FIG. 3a). When the convex periphery 12 of the special structure is stacked with the first ion-exchange membrane plate 41, the first oxygen chamber Z61 can be formed in the recessed center 13 of the special structure. The convex periphery 12 has holes 11 to form the hydrogen outlet channel Z1, the oxygen outlet channel Z2 and the water inlet channel Z3 respectively when being stacked. The recessed center 13 on the anode plate 1 can extend to communicate with those holes 11, which forms the oxygen outlet channel Z2 and the water inlet channel Z3.

As shown in FIG. 2, FIG. 4 and FIG. 7, one surface of the cathode plate 2 has the special structure (as shown in FIG. 4a). When the convex periphery 12 of the special structure is stacked with the second ion-exchange membrane plate 42, the first hydrogen chamber Z51 can be formed in the recessed center 13 of the special structure. The convex periphery 12 has holes 11 to form the hydrogen outlet channel Z1, the oxygen outlet channel Z2 and the water inlet channel Z3 respectively when being stacked. The recessed center 13 on the cathode plate 2 can extend to communicate with those holes 11, which forms the hydrogen outlet channel Z1.

As shown in FIG. 2, FIG. 5 and FIG. 7, when the anode plate 1, the cathode plate 2 and the bipolar electrode plate 3 are stacked with each other, the bipolar electrode plate 3 is disposed between the anode plate 1 and the cathode plate 2 (as shown in FIG. 6). Wherein, one surface of the anode plate 1 and one surface of the cathode plate 2 having the special structure will be disposed to face each other. The bipolar electrode plate 3 has the special structure, which is the same as or similar to the special structure on the cathode plate 2, on the cathode surface 301 facing the anode plate 1, and has the special structure, which is the same as or similar to the special structure on the anode plate 1, on the anode surface 302 facing the cathode plate 2. The bipolar electrode plate 3 has the cathode surface 301 and the anode surface 302, and each of the cathode surface 302 (as shown in FIG. 5b) and the anode surface (as shown in FIG. 5a) has the special structure. When the convex periphery 12 of the cathode surface 301 is stacked with the first ion-exchange membrane plate 41, the second hydrogen chamber Z52 is formed in the recessed center 13. When the convex periphery 12 of the anode surface 302 is stacked with the second ion-exchange membrane plate 42, the second oxygen chamber Z62 is formed in the recessed center 13. The convex peripheries 12 of the cathode surface 301 and the anode surface 302 have the holes 11 to form the hydrogen outlet channel Z1, the oxygen outlet channel Z2 and the water inlet channel Z3 respectively when being stacked. Wherein, the recessed center 13 on the cathode surface 301 can extend to communicate with those holes 11, which forms the hydrogen outlet channel Z1. The recessed center 13 on the anode surface 302 can extend to communicate with those holes 11, which forms the oxygen outlet channel Z2 and the water inlet channel Z3.

The communication method between the recessed center 13 and the hydrogen outlet channel Z1, the oxygen outlet channel Z2 or the water inlet channel Z3 is that the height of a junction between the corresponding holes 11 of the convex peripheries 12 and the recessed center 13 is designed to be the same as the height of the recessed center 13; thereby, the junction will be formed a communication space. Two ends of the communication space communicate the hole 11 and the recessed center 13, and the two side walls of the communication space are the convex peripheries 12.

In addition, except for the special structure, the anode plate 1 and the cathode plate 2 respectively have prominent structures 16 to receive a positive current and a negative current of the external power supplier, and the bipolar electrode plate has no such prominent structure 16. The reason why the anode plate 1, the cathode plate 2 and the bipolar electrode plate 3 are designed to have different structures is that the expanded ion-exchange membrane electrolysis cell E of the present invention uses disposing the bipolar electrode plate 3 between the anode plate 1 and the cathode plate 2 to form a potential difference to cause one surface of the bipolar electrode plate 3 to turn into the anode and another surface to turn into the cathode. This design allows the expanded ion-exchange membrane electrolysis cell E of the present invention to use the bipolar electrode plate 3 to eliminate the arrangement of communicating each electrode plate with current, and also eliminate the problem causing by connecting many electrode plates to anode or cathode.

Please refer to FIG. 1 and FIG. 7 again. As shown in FIG. 7, for clear illustrations, an electrolytic space Z4, the first hydrogen chamber Z51, the second hydrogen chamber Z52, the first oxygen chamber Z61 and the second oxygen chamber Z62 are marked with dotted lines to indicate the spatial positions. In one embodiment, a plurality of oxygen chambers Z6 are formed between the anode plate 1 and the first ion-exchange membrane plate 41 and between at least one bipolar electrode plate 3 and the second ion-exchange membrane plate 42. A plurality of hydrogen chambers Z5 are formed between the first ion-exchange membrane plate 41 and the at least one bipolar electrode plate 3 and between the second ion-exchange membrane plate 42 and the cathode plate 2. When being stacked, the hydrogen outlet channel Z1 communicates with the hydrogen chambers A5, and the oxygen outlet channel Z2 and the water inlet channel Z3 communicate with oxygen chambers Z6.

In a preferred embodiment, the oxygen chambers Z6 comprise the first oxygen chamber Z61 adjacent to the anode plate 1. One surface of the anode plate 1 has the convex peripheries 12 and the recessed center 13. When the convex peripheries 12 is stacked with the first ion-exchange membrane plate 41, a space is formed in the recessed center 13, and the first oxygen chamber Z61 comprises the space. The convex peripheries 12 has holes to respectively correspond to a portion of the hydrogen outlet channel Z1, a portion of the oxygen outlet channel Z2 and a portion of the water inlet channel Z3, and the oxygen outlet channel Z2 and the water inlet channel Z3 communicate with the recessed center 13.

In a preferred embodiment, the hydrogen chambers Z5 comprise the first hydrogen chamber Z51 adjacent to the cathode plate 2. One surface of the cathode plate 2 has the convex peripheries 12 and the recessed center 13. When the convex periphery 12 is stacked with the second ion-exchange membrane plate 42, a space is formed in the recessed center 13. The first hydrogen chamber Z51 comprises the space, and the hydrogen outlet channel Z1 communicates with the recessed center 13.

In a preferred embodiment, at least one bipolar electrode plate 3 has the cathode surface 301 and the anode surface 302, and each anode surface 301 and the anode surface 302 has the convex peripheries 12 and the recessed center 13. The hydrogen chambers Z5 comprise the second hydrogen chamber Z52 adjacent to the cathode surface 301 of the at least one bipolar electrode plate 3. When the convex periphery 12 of the cathode surface 301 is stacked with the first ion-exchange membrane plate 41, a space is formed in the recessed center 13. The second hydrogen chamber Z52 comprises the space. The oxygen chambers Z6 comprise the second oxygen chamber Z62 adjacent to the anode surface 302 of the at least one bipolar electrode plate 3. When the convex periphery 12 of the anode surface 302 is stacked with the second ion-exchange membrane plate 42, a space is formed in the recessed center 13. The second oxygen chamber Z62 comprises the space. Each the convex periphery 12 of the cathode surface 301 and the anode surface 302 has holes to respectively correspond to a portion of the hydrogen outlet channel Z1, a portion of the oxygen outlet channel Z2 and a portion of the water inlet channel Z3. The hydrogen outlet channel Z1 communicates with the recessed center 13 of the cathode surface 301, and the oxygen outlet channel Z2 and the water inlet channel Z3 communicate with the recessed center 13 of the anode surface 302.

As shown in FIG. 7, one hydrogen chamber and one oxygen chamber, which are separated by one ion-exchange membrane plate, can be combined to form one electrolytic space Z4. Therefore, in the electrolytic space Z4, which is formed between the anode plate 1 and the bipolar electrode plate 3, the first oxygen chamber Z61 is disposed between the first ion-exchange membrane plate 41 and the anode plate 1, and the second hydrogen chamber Z52 is disposed between the first ion-exchange membrane plate 41 and the bipolar electrode plate 3. In the electrolytic space Z4, which is formed between the cathode plate 2 and the bipolar electrode plate 3, the first hydrogen chamber Z51 is disposed between the second ion-exchange membrane plate 42 and the cathode plate 2, and the second oxygen chamber Z62 is disposed between the second ion-exchange membrane plate 42 and the bipolar electrode plate 3. Wherein, due to the special structure design of the anode plate 1, the cathode plate 2 and the bipolar electrode plate 3, the first oxygen chamber Z61 communicates with the second oxygen chamber Z62 through the oxygen outlet channel Z2, and the first hydrogen chamber Z51 communicates with the second hydrogen chamber Z52 through the hydrogen outlet channel Z1. In the other words, the hydrogen outlet channel Z1, the oxygen outlet channel Z2 and the water inlet channel Z3 can communicate the electrolytic spaces Z4 with each other. Further, the first oxygen chamber Z61 is not fluidly communicated with the first hydrogen chamber Z51 and the second hydrogen chamber Z52, and the second oxygen chamber Z62 is not fluidly communicated with the first hydrogen chamber Z51 and the second hydrogen chamber Z52.

Please refer to FIG. 1, FIG. 2 and FIG. 7 again. In order to reduce the possibility of water leakage and gas leakage in the expanded ion-exchange membrane electrolysis cell E, which is formed by stacking with each other, and to keep the hydrogen outlet channel Z1, the oxygen outlet channel Z2, the water inlet channel Z3 and the electrolytic spaces Z4 to maintain their independent spaces, the expanded ion-exchange membrane electrolysis cell E in present invention further comprises a plurality of silicon sealing gaskets 6. Each of silicon sealing gaskets 6 are respectively disposed between the anode plate 1 and the first ion-exchange membrane plate 41, between the first ion-exchange membrane plate 41 and the bipolar electrode plate 3, between the bipolar electrode plate 3 and the second ion-exchange membrane plate 42, and between the second ion-exchange membrane plate 42 and the cathode plate 2. The silicon sealing gasket 6 has an annular section 62 and a hollow section 61 formed by the annular section 62. The hydrogen outlet channel Z1, the oxygen outlet channel Z2, and the water inlet channel Z3 pass through the annular section 62 of each of the silicon sealing gaskets 6. The hollow section 61 coincides with the electrolytic spaces Z4. In addition, one surface of the silicon sealing gaskets 6, which faces the adjacent anode plate 1, the adjacent cathode plate 2 or the adjacent bipolar electrode plate 3, has a linear convex design to enhance the sealing effect.

In order to improve the electrolysis efficiency of the expanded ion-exchange membrane electrolysis cell E of the present invention, the expanded ion-exchange membrane electrolysis cell E of the present invention further comprises a plurality of diffuser plates 7 respectively disposed in the hollow section 61 of each of the silicon sealing gaskets 6, and respectively attached to the adjacent first ion-exchange membrane plate 41 or the adjacent second ion-exchange membrane plate 42. The bumps 14 of the anode plate 1, the cathode plate 2 and the bipolar electrode plate 3 are configured to abut the corresponding diffuser plate 7. When the anode plate 1, the cathode plate 2, the bipolar electrode plate 3, the first ion-exchange membrane plate 41 and the second ion-exchange membrane plate 42 are stacked with each other to form the expanded ion-exchange membrane electrolysis cell E, the bumps 14 make the corresponding diffuser plate 7 abut the corresponding first ion-exchange membrane plate 41 or the corresponding second ion-exchange membrane plate 42. The grooves 15 between the bumps 14 respectively communicate with at least one of the hydrogen outlet channel Z1, the oxygen outlet channel Z2 and the water inlet channel Z3. In detail, when the bumps 14 abut against the corresponding diffuser plate 7 to let the corresponding diffuser plate 7 abut the corresponding first ion-exchange membrane plate 41 or the corresponding second ion-exchange membrane plate 42, the resistance generated by a gap between the first ion-exchange membrane plate 41 or the second ion-exchange membrane plate 42 and the diffuser plate 7 can be reduced. In an embodiment, the diffuser plate 7 is a porous conductive material having a plurality of pores. At this time, the diffuser plate 7 can be regarded as an extension of the anode plate 1, the cathode plate 2 and the bipolar electrode plate 3. Therefore, the diffuser plate 7 can form an electric field by receiving the current in the anode plate 1, the cathode plate 2 or the bipolar electrode plate 3, so that the hydrogen ions and the hydroxide ions can make directional movement in the pores of the diffuser plate 7. In the pores of the diffuser plate 7, between the diffuser plate 7 and the catalytic layer, which is disposed on the first ion-exchange membrane plate 41 or the second ion-exchange membrane plate 42, the anode causes the water, which is adjacent to the anode, to lose electrons to generate oxygen, and the cathode causes the water, which is adjacent to the cathode, to obtain electrons to generate hydrogen. The pores of the diffuser plate 7 can also allow the water, the hydrogen, the oxygen to flow through the pores, and then to promote the rapid generation of the hydrogen and the oxygen. The hydrogen bubbles and the oxygen bubbles on the electrode plate and the diffuser plate 7 are taken away from thereof through the flow of the water, and are leaded to the hydrogen outlet channel Z1 and the oxygen outlet channel Z2 to improve the electrolysis efficiency. In one embodiment, the material of the diffuser plate 7 may be titanium with high stability. Titanium can assist the electrolytic function, but does not participate in the electrolytic function.

Figure 8A:
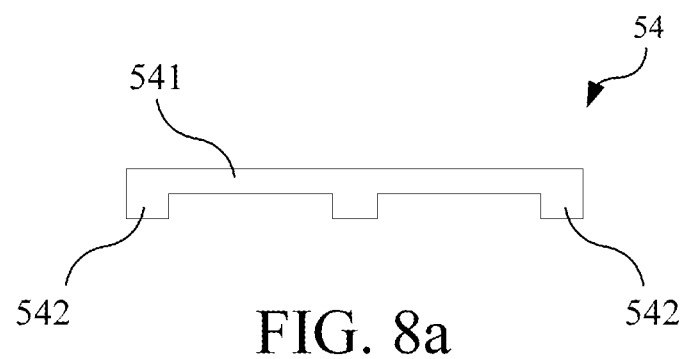
FIG. 8a shows the side view of a separator according to FIG. 1.
Figure 8B:
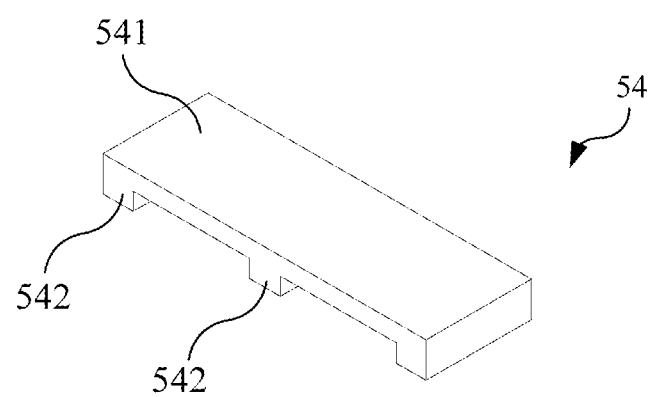
FIG. 8b shows the appearance schematic diagram of the separator according to FIG. 1.
Figure 9A:
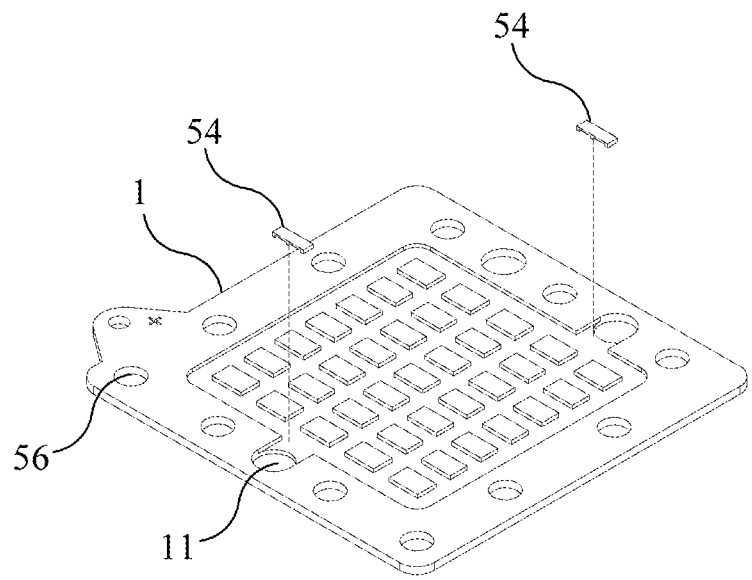
FIG. 9a shows the usage status schematic diagram of the separator according to FIG. 1.
Figure 9B:
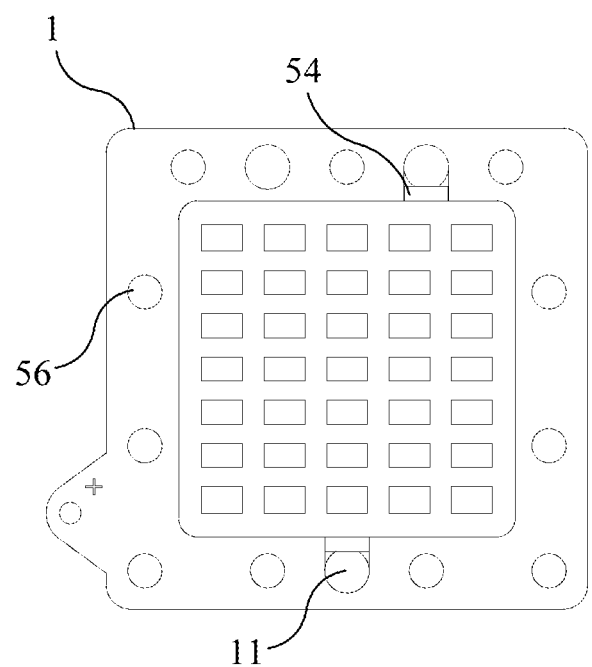
FIG. 9b shows the top view of the usage status schematic diagram of the separator according to FIG. 1.

Please refer to FIG. 7 to FIG. 9. FIG. 8a shows the side view of a separator 54 according to FIG. 1. FIG. 8b shows the appearance schematic diagram of the separator 54 according to FIG. 1. FIG. 9a shows the usage status schematic diagram of the separator 54 according to FIG. 1. FIG. 9b shows the top view of the usage status schematic diagram of the separator 54 according to FIG. 1. In order to prevent the silicon sealing gaskets 6 from blocking the communication among the first hydrogen chamber Z51, the second hydrogen chamber Z52 and the hydrogen outlet channel Z1, and among the first oxygen chamber Z61, the second oxygen chamber Z62, the oxygen outlet channel Z2, and the water inlet channel Z3, the expanded ion-exchange membrane electrolysis cell E of the present invention further comprises a plurality of separators 54. As shown in FIG. 8a and FIG. 8b, the separator 54 comprises a flat plate 541, and a plurality of support section 542 disposed on the flat plate 541. Each adjacent support section 542 is spaced at a certain distance. As shown in FIG. 9a and FIG. 9b, the separators 54 are respectively disposed at the junctions of the first hydrogen chamber Z51 and the second hydrogen chamber Z52 communicate with the hydrogen outlet channel Z1, and the junctions of the first oxygen chamber Z61 and the second oxygen chamber Z62 communicate with the oxygen outlet channel Z2, and the water inlet channel Z3. The flat plate 541 abuts against the corresponding silicon sealing gasket 6, so that the ports are formed by the support section 542 and the anode plate 1, by the support section 542 and the cathode plate 2, and by the support section 542 and the bipolar electrode plate 3. The ports respectively communicate the first hydrogen chamber Z51 and the second hydrogen chamber Z52 with the hydrogen outlet channel Z1, and communicate the first oxygen chamber Z61 and the second oxygen chamber Z62 with the oxygen outlet channel Z2 and the water inlet channel Z3.

In other embodiment, please refer to FIG. 1 again. In order to make the expanded ion-exchange membrane electrolysis cell E be able to quickly dissipate the thermal energy generated by the electrolysis during the electrolysis reaction, so as not to overheat therein, the expanded ion-exchange membrane electrolysis cell E of the present invention further comprises at least one electrical insulation thermal board 8. The electrical insulation thermal board 8 is disposed on at least one position of a side of the anode plate 1 opposite to the other side facing the cathode plate 2 and a side of the cathode plate 2 opposite to the other side facing the anode plate 1. The electrical insulation thermal board 8 is configured to isolate the current of the expanded ion-exchange membrane electrolysis cell E from the external environment, and conduct the thermal energy in the expanded ion-exchange membrane electrolysis cell E to the external environment. In addition, the expanded ion-exchange membrane electrolysis cell E of the present invention can also further comprise at least one radiating plate 9 disposed on a side of the anode plate opposite 1 to the other side facing the cathode plate 2 and a side of the cathode plate 2 opposite to the other side facing the anode plate 1. The radiating plate 9 is configured to dissipate the thermal energy in the expanded ion-exchange membrane electrolysis cell E to the external environment. In addition, since one ends of the hydrogen conduit 51, the oxygen conduit 52 and the water conduit 53 respectively have protruding outer edge 58, when the expanded ion-exchange membrane electrolysis cell E is stacking and assembling, the hydrogen conduit 51, the oxygen conduit 52 and the water conduit 53 are disposed after the anode plate 1 first, and then the radiating plate 9 is disposed. Thereby, the protruding outer edge 58 is sandwiched between the anode plate 1 and the radiating plate 9.

Figure 10:
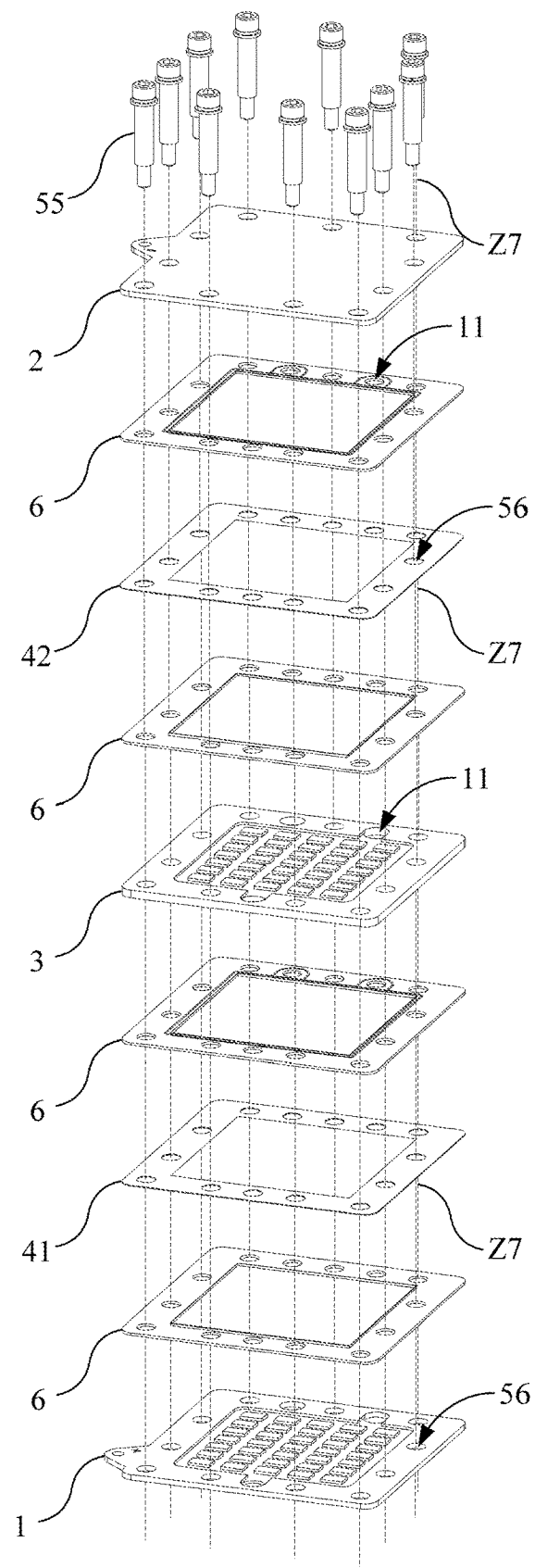
FIG. 10 shows a schematic diagram of a lock channel according to FIG. 1.
Figure 11:
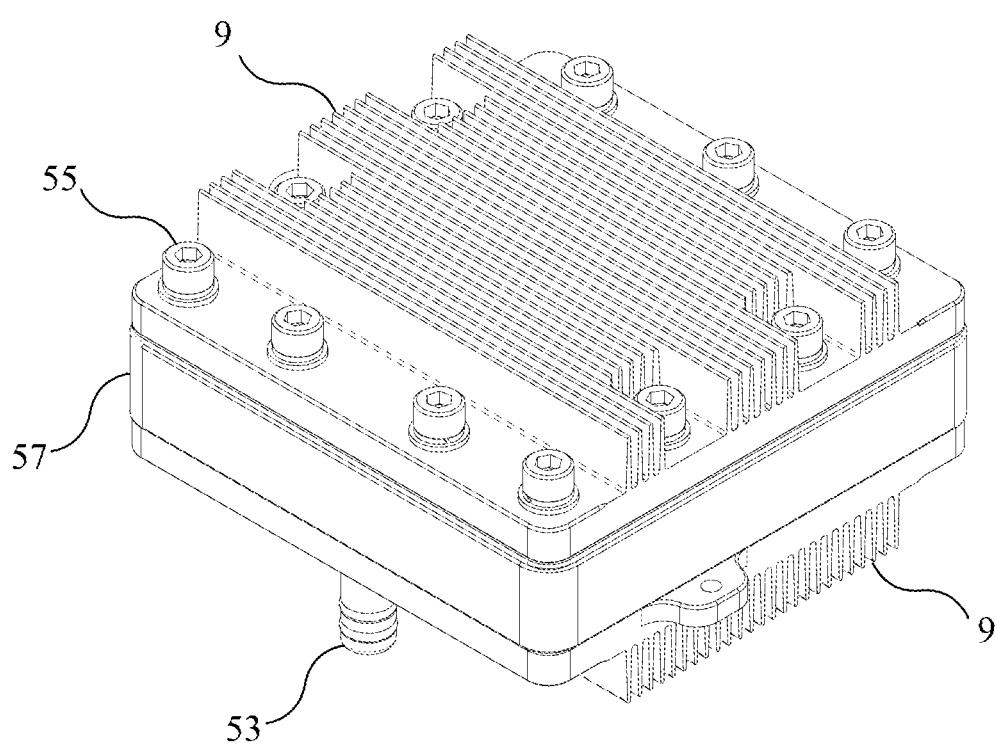
FIG. 11 shows an appearance schematic diagram of the expanded ion-exchange membrane electrolysis cell after stacking according to FIG. 1.

Please refer to FIG. 1, FIG. 10 and FIG. 11. FIG. 10 shows a schematic diagram of a lock channel Z7 according to FIG. 1. FIG. 11 shows an appearance schematic diagram of the expanded ion-exchange membrane electrolysis cell E after stacking according to FIG. 1. In order to make the expanded ion-exchange membrane electrolysis cell E stable and tight, the expanded ion-exchange membrane electrolysis cell E of the present invention further comprises a plurality of lock channels Z7 and a plurality of lock components 55. The anode plate 1, the cathode plate 2, the bipolar electrode plate 3, the first ion-exchange membrane plate 41, the second ion-exchange membrane plate 42, the silicon sealing gaskets 6, electrical insulation thermal board 8 and the radiating plate 9 of the expanded ion-exchange membrane electrolysis cell E of the present invention all have corresponding lock holes 56. After being stacked, the corresponding lock holes 56 will be stacked to form the lock channels Z7. Each lock channels Z7 pass through the anode plate 1, the cathode plate 2, the bipolar electrode plate 3, the first ion-exchange membrane plate 41, the second ion-exchange membrane plate 42, the silicon sealing gaskets 6, electrical insulation thermal board 8 and the radiating plate 9 for fitting of lock components, and FIG. 11 shows the expanded ion-exchange membrane electrolysis cell E after being locked.

Please refer to FIG. 1 and FIG. 11 again. In order to insulate and fix the structure of the expanded ion-exchange membrane electrolysis cell E, the expanded ion-exchange membrane electrolysis cell E of the present invention further comprises a frame 57. The frame 57 is set around the periphery of the expanded ion-exchange membrane electrolysis cell E after being stacked with each other.

Figure 12:
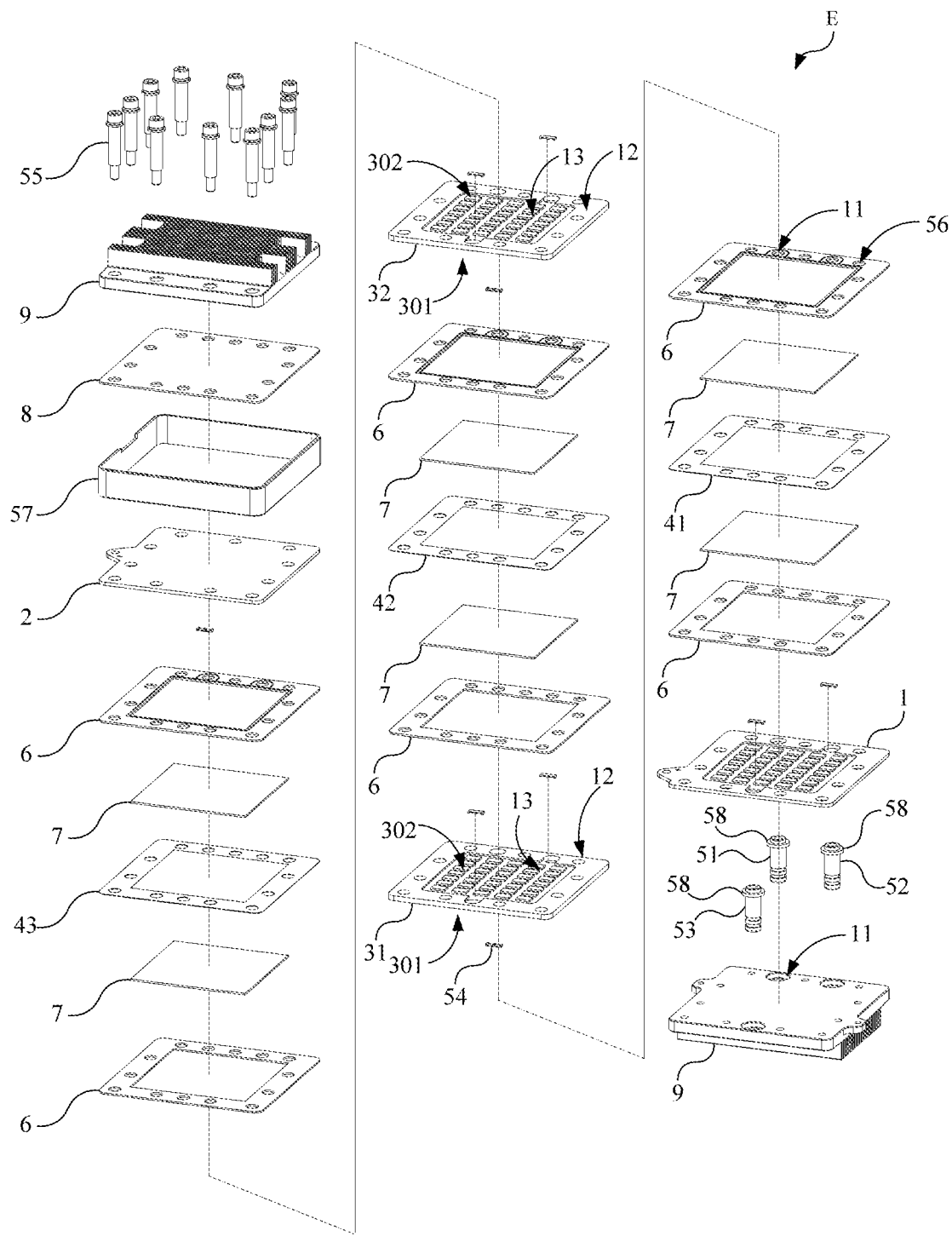
FIG. 12 shows a structural exploded schematic diagram of another embodiment of an expanded ion-exchange membrane electrolysis cell of the present invention.

Please refer to FIG. 1 and FIG. 12. FIG. 12 shows a structural exploded schematic diagram of another embodiment of an expanded ion-exchange membrane electrolysis cell E of the present invention. Persons having ordinary skills in the art can understand that FIG. 1 shows the structure of the expanded ion-exchange membrane electrolysis cell E having one bipolar electrode plate 3. To make the expanded ion-exchange membrane electrolysis cell E increase the amount of the hydrogen and the oxygen generated by electrolyzing water, as shown in FIG. 12, FIG. 12 is an extension embodiment of FIG. 1, that is, a second bipolar electrode plate 32 is added to the embodiment of FIG. 1. Based on the foregoing technical characteristics, it can be inferred that when the second bipolar electrode plate 32 is disposed between the first bipolar electrode plate 31 and the cathode plate 2, the second ion-exchange membrane plate 42 is disposed between the first bipolar electrode plate 31 and the second bipolar electrode plate 32, and further one third ion-exchange membrane plate 43 is disposed between the second bipolar electrode plate 32 and the cathode plate 2. In addition, a third oxygen chamber (not shown in FIG.) is adjacent to the anode surface 302 of the second bipolar electrode plate 32, and the third hydrogen chamber is adjacent to the cathode surface 301 of the second bipolar electrode plate 32. Please refer to FIG. 2 and FIG. 7 together. The third oxygen chamber communicates with the first oxygen chamber Z61 and the second oxygen chamber Z62 through the oxygen outlet channel Z2, and the third hydrogen chamber communicates with the first hydrogen chamber Z51 and the second hydrogen chamber Z52 through the hydrogen outlet channel Z1. In a preferred embodiment, the third oxygen chamber is not fluidly communicated with the first hydrogen chamber Z51, the second hydrogen chamber Z52 and the third hydrogen chamber, and the third hydrogen chamber is not fluidly communicated with the first oxygen chamber Z61, the second oxygen chamber Z62 and the third oxygen chamber.

Through the cooperation design in holes 11, recessed centers 13 and the convex periphery 12 of the electrode plate of the expanded ion-exchange membrane electrolysis cell E, the three hydrogen chamber can communicate with each other by the hydrogen outlet channel Z1 and output the hydrogen from the hydrogen outlet channel Z1 during electrolysis. In addition, the three oxygen chambers can communicate with each other by the oxygen outlet channel Z2 and the water inlet channel Z3, therefore the water is input to the electrolytic spaces Z4 from the water inlet channel Z3 for electrolysis, and output the oxygen from the oxygen outlet channel Z2 during electrolysis. It can be understood that a person skilled in the art can determine the number of the electrode plates stacked in the expanded ion-exchange membrane electrolysis cell E according to their respective requirements, and is not limited thereto.

Wherein, one surface of the anode plate 1 has the convex periphery 12 and the recessed center 13. When the convex periphery 12 of the anode plate 1 is stacked with the first ion-exchange membrane plate 41, the first oxygen chamber Z61 is formed in the recessed center 13 of the anode plate 1. The convex periphery 12 has holes 11 to form the hydrogen outlet channel Z1, the oxygen outlet channel Z2 and the water inlet channel Z3 respectively when being stacked. The holes 11, which form the oxygen outlet channel Z2 and the water inlet channel Z3, communicate the recessed center 13 of the anode plate 1. One surface of the cathode plate 2 also has the convex periphery 12 and the recessed center 13. When the convex periphery 12 of the cathode plate 2 is stacked with the second ion-exchange membrane plate 42, the first hydrogen chamber Z51 is formed in the recessed center 13 of the cathode plate 2, and the recessed center 13 of the cathode plate 2 communicates the hydrogen outlet channel Z1. The first bipolar electrode plate 31 has the cathode surface 301 and the anode surface 302, and the cathode surface 301 and the anode surface 302 respectively have the convex periphery 12 and the recessed center 13. When the convex periphery 12 of the cathode surface 301 is stacked with the first ion-exchange membrane plate 41, the second hydrogen chamber Z52 is formed in the recessed center 13 of the cathode surface 301. When the convex periphery 12 of the anode surface 302 is stacked with the second ion-exchange membrane plate 42, the second oxygen chamber Z62 is formed in the recessed center 13 of the anode surface 302. The convex peripheries 12 of cathode surface 301 and the anode surface 302 respectively have holes 11 to form the hydrogen outlet channel Z1, the oxygen outlet channel Z2 and the water inlet channel Z3 when being stacked. The holes 11, which form the hydrogen outlet channel Z1, communicate with the recessed center 13 of the cathode surface 301. The holes 11, which form the oxygen outlet channel Z2 and the water inlet channel Z3, communicate with the recessed center 13 of the anode surface 302. The second bipolar electrode plate 32 also has the cathode surface 301 and the anode surface 302, and the cathode surface 301 and the anode surface 302 respectively have the convex periphery 12 and the recessed center 13. When the convex periphery 12 of the cathode surface 301 is stacked with the second ion-exchange membrane plate 42, the third hydrogen chamber is formed in the recessed center 13 of the cathode surface 301. When the convex periphery 12 of the anode surface 302 is stacked with the third ion-exchange membrane plate 43, the third oxygen chamber is formed in the recessed center 13 of the anode surface 302. The convex peripheries 12 of cathode surface 301 and the anode surface 302 respectively have holes 11 to form the hydrogen outlet channel Z1, the oxygen outlet channel Z2 and the water inlet channel Z3 when being stacked. The holes 11, which form the hydrogen outlet channel Z1, communicate with the recessed center 13 of the cathode surface 301. The holes 11, which form the oxygen outlet channel Z2 and the water inlet channel Z3, communicate with the recessed center 13 of the anode surface 302.

In addition, the technical characteristics in the specific embodiment shown in FIG. 12 are the same as those described above. FIG. 12 is an extension embodiment of FIG. 1. Thus, the technical characteristics can be deduced by analogizing with the aforementioned technical characteristics, and will not be repeated here.

Compared with the prior art, the anode plate 1, the cathode plate 2, the first bipolar electrode plate 31, the first ion-exchange membrane plate 41 and the second ion-exchange membrane plate 42 of the expanded ion-exchange membrane electrolysis cell E of the present invention are independent plates. When the problem of calcium accumulation occurs after electrolysis, the expanded ion-exchange membrane electrolysis cell E can be disassembled for cleaning. Even when any part of the expanded ion-exchange membrane electrolysis cell E is severely damaged, the damaged plate can be directly replaced with a new one intended of replacing multiple components or the entire electrolysis. In addition, the anode plate 1, the cathode plate 2 and the bipolar electrode plate 3 of the expanded ion-exchange membrane electrolysis cell E of the present invention can all be integrally formed electrode plates without the problem of unstable installation that prevents the electrolytic cell from operating. Compared to the traditional electrolysis cell that requires the anode plate 1 and the cathode plate 2 to be staggered, the expanded ion-exchange membrane electrolysis cell E of the present invention uses the first bipolar electrode plate 31 to eliminate the configuration that requires each electrode plate to communicate with the current, and also to eliminate the problem of the traditional electrolysis cell be caused by the multiple electrode plates connecting with the positive contacts and negative contacts. In this way, the number of the electrode plates in the expanded ion-exchange membrane electrolysis cell E is less than that of the traditional electrolysis cell, thereby saving costs and the volume of the expanded ion-exchange membrane electrolysis cell E after assembled.

In addition, the expanded ion-exchange membrane electrolysis cell E of the present invention uses the structural design of the anode plate 1, the cathode plate 2 and the bipolar electrode plate 3 themselves to guide the flow of water and gas, instead of the traditional electrolysis cell that uses a linear sealing gasket to guide the flow. Therefore, the expanded ion-exchange membrane electrolysis cell E eliminates the problem that the traditional electrolysis cell is misaligned due to aging of the sealing gasket or due to the linear sealing gasket.

With the examples and explanations mentioned above, the features and spirits of the invention are hopefully well described. More importantly, the present invention is not limited to the embodiment described herein. Those skilled in the art will readily observe that numerous modifications and alterations of the cell may be made while retaining the teachings of the invention. Accordingly, the above disclosure should be construed as limited only by the metes and bounds of the appended claims.

What is claimed is:

1. An expanded ion-exchange membrane electrolysis cell, comprising:
   an anode plate;
   a cathode plate;
   at least one bipolar electrode plate disposed between the anode plate and the cathode plate;
   a first ion-exchange membrane plate disposed between the anode plate and the at least one bipolar electrode plate;
   a second ion-exchange membrane plate disposed between the at least one bipolar electrode plate and the cathode plate;
   a surface of the anode plate, a surface of the cathode plate and two surfaces of the at least one bipolar electrode plate respectively having a recessed center, the recess center having a plurality of grooves connected to each other and a plurality of bumps formed between the grooves, wherein the grooves comprise a first set of grooves extending along a first direction and a second set of grooves extending along a second direction different from the first direction, so as to form the bumps arranged in a 2D array;
   a sealing gasket disposed next to the cathode plate;
   a first separator comprising a flat plate and a support section disposed on the flat plate;
   a oxygen chamber formed between the anode plate and the first ion-exchange membrane plate or between the at least one bipolar electrode plate and the second ion-exchange membrane plate; and
   a hydrogen chamber formed between the first ion-exchange membrane plate and the at least one bipolar electrode plate or between the second ion-exchange membrane plate and the cathode plate;
   wherein a hydrogen outlet channel, an oxygen outlet channel and a water inlet channel are formed in the expanded ion-exchange membrane electrolysis cell, the hydrogen outlet channel is coupled to the hydrogen chamber, and the oxygen outlet channel and the water inlet channel are coupled to the oxygen chamber;
   wherein, the first separator is disposed at a connecting channel of the hydrogen chamber to the hydrogen outlet channel, the connecting channel has no bump therein, and the flat plate abuts against and bears the sealing gasket to form a first port in the connecting channel by the support section.

2. The expanded ion-exchange membrane electrolysis cell of the claim 1, wherein the oxygen chamber comprises a first oxygen chamber adjacent to the anode plate, the surface of the anode plate has a periphery and the recessed center is surrounded by the periphery, a space is formed in the recessed center, and the first oxygen chamber comprises the space; the periphery has a plurality of holes corresponding to a portion of the hydrogen outlet channel, a portion of the oxygen outlet channel and a portion of the water inlet channel when the anode plate and the first ion-exchange membrane plate are stacked, and the oxygen outlet channel and the water inlet channel are coupled to the recessed center.

3. The expanded ion-exchange membrane electrolysis cell of the claim 1, wherein the hydrogen chamber comprises a first hydrogen chamber adjacent to the cathode plate, the surface of the cathode plate has a periphery and the recessed center is surrounded by the periphery, a space is formed in the recessed center, the first hydrogen chamber comprises the space, and the hydrogen outlet channel is coupled to the recessed center.

4. The expanded ion-exchange membrane electrolysis cell of the claim 1, wherein the at least one bipolar electrode plate has a cathode surface and an anode surface, each of the cathode surface and the anode surface has a periphery and the recessed center is surrounded by the periphery, the hydrogen chamber is adjacent to the cathode surface of the at least one bipolar electrode plate, a first space is formed in the recessed center, and the hydrogen chamber comprises the first space; the oxygen chamber is adjacent to the anode surface of the at least one bipolar electrode plate, a second space is formed in the recessed center, and the oxygen chamber comprises the second space; the peripheries of the cathode surface and the anode surface have a plurality of holes corresponding to a portion of the hydrogen outlet channel, a portion of the oxygen outlet channel and a portion of the water inlet channel when being stacked, the hydrogen outlet channel is coupled to the recessed center of the cathode surface, and the oxygen outlet channel and the water inlet channel are coupled to the recessed center of the anode surface.

5. The expanded ion-exchange membrane electrolysis cell of the claim 1, wherein the sealing gasket is a hollow annular structure formed by a hollow section and an annular section, and the hydrogen outlet channel, the oxygen outlet channel, or the water inlet channel pass through the annular section of sealing gasket.

6. The expanded ion-exchange membrane electrolysis cell of the claim 5, further comprising a diffuser plate disposed in the hollow section of each of the sealing gasket.

7. The expanded ion-exchange membrane electrolysis cell of the claim 6, wherein the bumps are configured to abut the diffuser plate, when the anode plate, the cathode plate, the at least one bipolar electrode plate, the first ion-exchange membrane plate and the second ion-exchange membrane plate are stacked, the bumps make the diffuser plate abuts the first ion-exchange membrane plate or the second ion-exchange membrane plate; the grooves are respectively coupled to at least one of the hydrogen outlet channel, the oxygen outlet channel and the water inlet channel.

8. The expanded ion-exchange membrane electrolysis cell of the claim 6, wherein the diffuser plate has a plurality of pores, so that water, hydrogen, and oxygen flow through the pores.

9. The expanded ion-exchange membrane electrolysis cell of the claim 5, further comprising a second separator, which is respectively disposed at the junction of the oxygen chamber to the oxygen outlet channel or to the water inlet channel, wherein the second separator respectively abuts against the sealing gaskets to form a second port, and the oxygen outlet channel or the water inlet channel are coupled to the oxygen chamber through the second port.

10. The expanded ion-exchange membrane electrolysis cell of the claim 1, further comprising at least one electrical insulation thermal board disposed above at least one position of a side of the anode plate opposite to the other side facing the cathode plate and a side of the cathode plate opposite to the other side facing the anode plate, wherein the at least one electrical insulation thermal board is configured to isolate the current of the expanded ion-exchange membrane electrolysis cell from the external environment, and conduct the thermal energy in the expanded ion-exchange membrane electrolysis cell to the external environment.

11. The expanded ion-exchange membrane electrolysis cell of the claim 1, further comprising at least one radiating plate disposed above at least one position of a side of the anode plate opposite to the other side facing the cathode plate and a side of the cathode plate opposite to the other side facing the anode plate, wherein the at least one radiating plate is configured to dissipate the thermal energy in the expanded ion-exchange membrane electrolysis cell to the external environment.

12. The expanded ion-exchange membrane electrolysis cell of the claim 1, further comprising a plurality of lock channels and a plurality of lock components, wherein the lock channels pass through the anode plate, the cathode plate, the at least one bipolar electrode plate, the first ion-exchange membrane plate and the second ion-exchange membrane plate for fitting the lock components.

13. An expanded ion-exchange membrane electrolysis cell, comprising:
   an anode plate;
   a cathode plate;
   a first bipolar electrode plate disposed between the anode plate and the cathode plate;
   a first ion-exchange membrane plate being able to be accommodated between the anode plate and the first bipolar electrode plate;
   a second ion-exchange membrane plate being able to be accommodated between the cathode plate and the first bipolar electrode plate;
   a first oxygen chamber being adjacent to the anode plate;
   a first hydrogen chamber being adjacent to the cathode plate;
   a second oxygen chamber being adjacent to an anode surface of the first bipolar electrode plate; and
   a second hydrogen chamber being adjacent to a cathode surface of the first bipolar electrode plate;
   a sealing gasket disposed next to the cathode plate;
   a separator comprising a flat plate and a support section disposed on the flat plate;
   wherein an oxygen outlet channel is coupled to the first oxygen chamber and the second oxygen chamber, and a hydrogen outlet channel is coupled to the first hydrogen chamber and the second hydrogen chamber;
   wherein, the separator is disposed at a connecting channel of one of the hydrogen chambers to the hydrogen outlet channel, the connecting channel has no bump therein, and the flat plate abuts against and bears the sealing gasket to form a port in the connecting channel by the support section.

14. The expanded ion-exchange membrane electrolysis cell of the claim 13, wherein the first oxygen chamber is not fluidly coupled to the first hydrogen chamber and the second hydrogen chamber, and the second oxygen chamber is not fluidly coupled to the first hydrogen chamber and the second hydrogen chamber.

15. The expanded ion-exchange membrane electrolysis cell of the claim 13, wherein the oxygen outlet channel extends at least from the anode plate to the cathode plate, and the hydrogen outlet channel extends at least from the anode plate to the cathode plate.

16. The expanded ion-exchange membrane electrolysis cell of the claim 15, wherein the anode plate and the cathode plate respectively comprising:
   a first recessed center;
   a plurality of first bumps disposed in the first recessed center; and
   a plurality of first grooves disposed between the first bumps;
   wherein the first oxygen chamber comprises the first grooves of the anode plate, and the first grooves of the anode plate are coupled to the oxygen outlet channel; the first hydrogen chamber comprises the first grooves of the cathode plate, and the first grooves of the cathode plate are coupled to the hydrogen outlet channel.

17. The expanded ion-exchange membrane electrolysis cell of the claim 16, wherein the anode surface and the cathode surface of the first bipolar electron plate respectively comprising:
   a second recessed center;
   a plurality of second bumps disposed in the second recessed center; and
   a plurality of second grooves disposed between the second bumps;
   wherein the second oxygen chamber comprises the second grooves of the anode surface, and the second grooves of the anode surface are coupled to the oxygen outlet channel; the second hydrogen chamber comprises the second grooves of the cathode surface, and the second grooves of the cathode surface are coupled to the hydrogen outlet channel.

18. The expanded ion-exchange membrane electrolysis cell of the claim 15, further comprising an oxygen conduit and a hydrogen conduit, wherein the oxygen outlet channel passes through the cathode plate or the anode plate and is coupled to the oxygen conduit, and the hydrogen outlet channel passes through the cathode plate or the anode plate and is coupled to the hydrogen conduit.

19. The expanded ion-exchange membrane electrolysis cell of the claim 18, further comprising:
   a second bipolar electrode plate disposed between the anode plate and the cathode plate;
   a third oxygen chamber being adjacent to an anode surface of the second bipolar electrode plate; and
   a third hydrogen chamber being adjacent to a cathode surface of the second bipolar electrode plate;
   wherein the oxygen outlet channel is coupled to the first oxygen chamber, the second oxygen chamber and the third oxygen chamber, and the hydrogen outlet channel is coupled to the first hydrogen chamber, the second hydrogen chamber and the third hydrogen chamber.

20. The expanded ion-exchange membrane electrolysis cell of the claim 19, wherein the third oxygen chamber is not fluidly coupled to the first hydrogen chamber, the second hydrogen chamber and the third hydrogen chamber; and the third hydrogen chamber is not fluidly coupled to the first oxygen chamber, the second oxygen chamber and the third oxygen chamber.

* * * * *